Nov. 30, 1971  R. P. BUSHNELL  3,623,852
APPARATUS FOR GRINDING THREAD CUTTING TOOLS
Filed Oct. 16, 1969  2 Sheets-Sheet 1
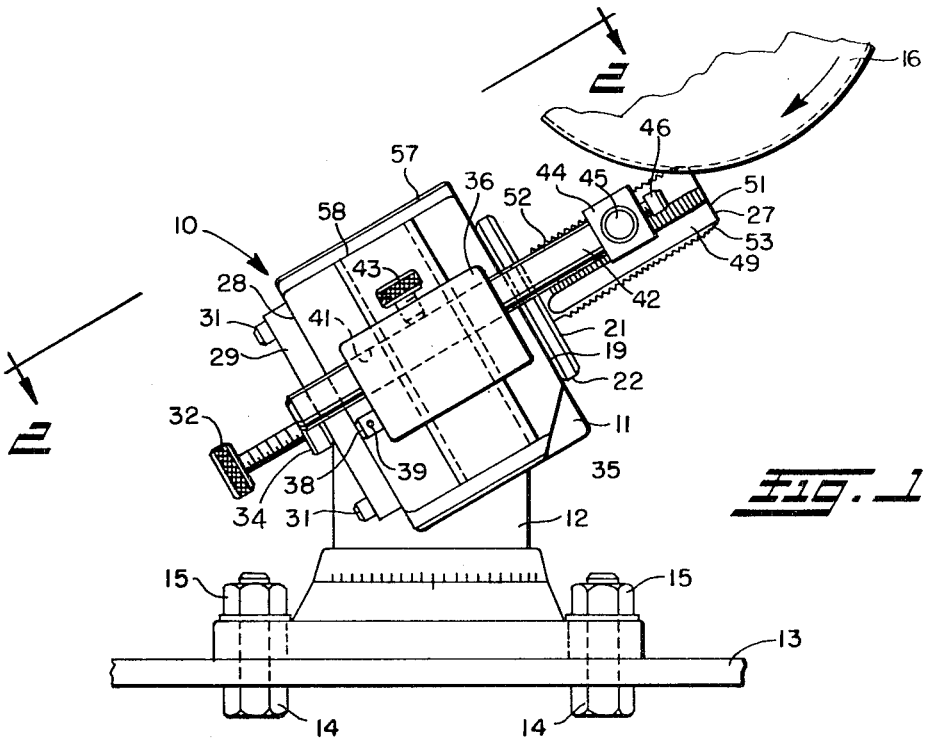
Fig. 1
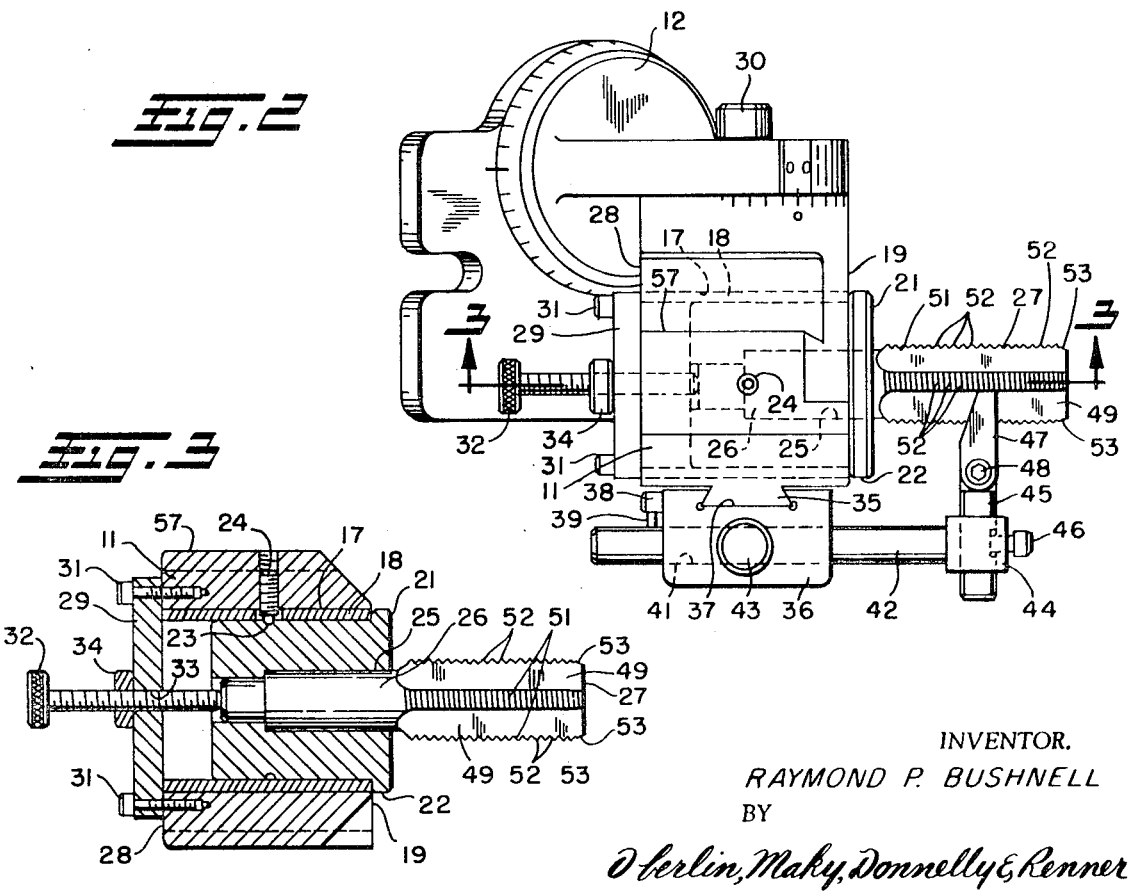
Fig. 2
Fig. 3
INVENTOR.
RAYMOND P. BUSHNELL
BY
Oberlin, Maky, Donnelly & Renner
ATTORNEYS

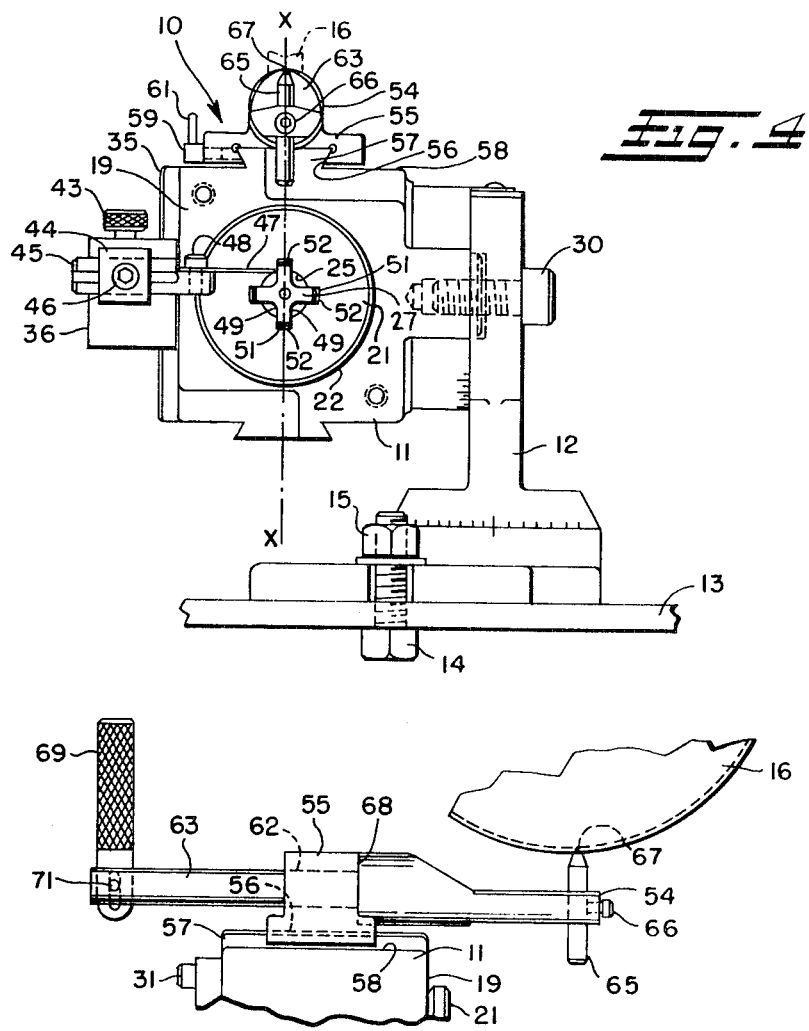

United States Patent Office 3,623,852
Patented Nov. 30, 1971

3,623,852
APPARATUS FOR GRINDING THREAD CUTTING TOOLS
Raymond P. Bushnell, Akron, Ohio
(200 Granger Road, Medina, Ohio 44256)
Filed Oct. 16, 1969, Ser. No. 866,868
Int. Cl. B24b 19/00, 7/00
U.S. Cl. 51—225
7 Claims

ABSTRACT OF THE DISCLOSURE

Apparatus for grinding thread cutting tools in which a tap holding fixture is mounted for movement in substantially the same plane as the plane of rotation of the grinding wheel and has a wheel dresser for shaping the periphery of the grinding wheel to a predetermined concave radius so that a land of the tap can be ground with a selected chamfer by moving the tap with the land positioned in the tap holding fixture into tangential engagement with the grinding wheel.

BACKGROUND OF THE INVENTION

This invention relates to the art of grinding tools and particularly to a process and apparatus for grinding thread cutting tools in which a tap holding fixture is used in conjunction with a grinding wheel for sharpening thread cutting taps. Tap sharpening equipment available at the present time was developed for use in large shops and in the tool sharpening business. Accordingly, the grinding machines are especially built to sharpen a substantial number of taps having the same size and the same number of flutes. For each size of tap and for a tap with a certain number of flutes there are special cams for automatically indexing the taps. Although these machines are automatic, they do not have any provision for positioning a land in the event the tap does not have equally spaced lands. This can result in defective grinding and a spoiled tap and work piece. The grinding wheel also has an axis of rotation positioned generally perpendicular to a plane through the axis of the tap which has caused low spots longitudinally of the tap cutting surface when there is chatter of the grinding wheel which may result from glazing of the wheel. In addition to these difficulties the machines available have been costly with prices which are prohibitive for a machine shop where only a limited number of taps are used. These machine shops must keep their taps sharpened to meet quality and production requirements and have had to send the taps to an outside concern for sharpening. During this time production is stopped unless duplicate taps are available. Since it is not always practical or economical to send taps out or have duplicates made a definite need exists for an improved low cost process and apparatus for tap sharpening which will provide high quality, accurate sharpening of taps having many sizes and shapes.

SUMMARY OF THE INVENTION

According to this invention, a tap sharpening fixture may be mounted on a grinder for grinding taps by moving the fixture in substantially the same plane as the plane of rotation of the grinding wheel. Accordingly, if there is any chatter of the grinding wheel the low spots will be circumferential and the cutting surface of the taps will remain effective. This fixture has a main body which holds the tap during the sharpening operation and a resilient positioning finger for indexing the tap in relationship to the grinding wheel and permitting the tap to be moved to the next grinding position. The main body may be mounted on a two-section swivel base for obtaining the desired angular position of the tap. The swivel base is mounted on a movable bed which provides for relative movement of the grinding wheel and the fixture body.

The fixture body also supports a diamond grinding wheel dresser for shaping the periphery of the grinding wheel to a predetermined concave cross section to conform with the chamfer of the tap. The wheel dresser is brought into engagement with the grinding wheel and through manual turning of the wheel dresser, the desired concave cross section of the grinding wheel periphery is provided. After the grinding wheel has been shaped the tap is mounted in the fixture with the positioning finger holding the land to be ground in the proper position. Adjustments are also provided for the length of the tap which extends out of the fixture body. The swivel base is used to set the angle of the tap so that the chamfer will be tangential to the periphery of the grinding wheel. Sharpening of the tap chamfer can then be accomplished by moving the tap sharpening fixture tangentially into grinding engagement with the grinding wheel.

Accordingly, the taps are accurately sharpened because the position of each land is established independently with no special adjustments for the number of flutes on the tap. The sharpening process maintains the taps concentric with the shank and the tap chamfer is sharpened at any desired angle. Clearances can be increased or decreased by moving the tap axially of the grinding wheel. Different size taps are also accommodated by substitution of a different size tap bushing and possible adjustment for the length of the tap.

The accompanying drawings show one preferred form made in accordance with and embodying this invention and which is representative of how this invention may be practiced.

BRIEF DESCRIPTION OF THE DRAWINGS

FIG. 1 is a side elevation of a tap holding fixture showing a fragmentary portion of the grinding wheel in tap sharpening engagement;

FIG. 2 is a view taken along the line 2—2 of FIG. 1;

FIG. 3 is a sectional view taken along the line 3—3 of FIG. 2;

FIG. 4 is an end elevation showing the tap holding fixture with the grinding wheel dresser in engagement with the grinding wheel shown in chain-dotted lines and broken away;

FIG. 5 is a side elevation of the wheel dresser shown in FIG. 4, parts being broken away; and FIG. 6 is a view like FIG. 1 showing the length adjusting mechanism for taps with long shanks, parts being broken away.

DETAILED DESCRIPTION

Referring to FIGS. 1 and 2, a tap grinding fixture 10 has a tool holding body 11 mounted on a swivel base 12 for adjustment of the tool holding body about horizontal and vertical axes. The swivel base 12 may be mounted on a movable bed 13 of a grinder by bolts 14 and nuts 15. A grinding wheel 16, shown in FIG. 1, is also mounted on the grinder for rotation in the clockwise direction by an electric motor or other suitable means not shown.

As shown in FIG. 3., the tool holding body 11 has an opening 17 which may be of cylindrical shape and extend through the body from one end to the other. The tool holding body 11 may be of aluminum or other easily machinable material and have a wear-resistant lining 18 of steel secured in the opening 17 as by a press fit. At the front end 19 of the tool holding body 11, a tap bushing 21 may be inserted in the opening 17 within the lining 18 and is held in position by abutment of a flange 22 of the tap bushing against the lining 18 at the front end of the tool holding body.

The tap bushing 21 may also have a circumferential notch or groove 23 for receiving a spring-loaded pin 24, the outer surface of which is in threaded engagement with the wall of a hole extending through the tool holding body 11 and the lining 18.

The tap bushing 21 has a bore 25 for receiving a shank 26 of a thread cutting tool such as a tap 27. Taps of different shank diameters may be accommodated by using different size tap bushings 21.

At the opposite or rear end 28 of the tool holding body 11, a back plate member 29 may be fastened to the tool holding body 11 as by machine screws 31. A tap length adjusting means such as thumbscrew 31. is threaded in a hole 33 in the plate member 29. The thumbscrew 32 is coaxial with the bore 25 in the tap bushing 21 so that the end of the thumbscrew may engage the end of the tap shank 26. By turning the thumbscrew 32, the distance which the tap 27 projects out of the tap bushing 21 may be adjusted. A lock nut 34 is threaded on the thumbscrew 32 adjacent the back plate 29 to hold the thumbscrew in position after the tap 27 has been turned to the desired position.

The swivel base 12 is mounted on one side of the tool holding body 11 as by adjustable screw 30 and a vertically extending dovetail track 35 is mounted on the opposite side for carrying tap-positioning means on a slide member 36 having a dovetail slot 37 in sliding engagement with the dovetail track. A locking screw 38 with a turning lever 39 may be threaded in the slide member 36 for engagement with the dovetail track to secure the slide member in any desired position along the track. The slide member 36 has a hole 41 extending through the slide member at right angles to the dovetail slot 37 through which a supporting rod 42 is inserted and held in place by a thumbscrew 43 which is threaded in a hole extending from the outer face of the slide member into the hole 41 containing the supporting rod 42. At the forward end of the supporting rod 42 which is parallel to and spaced from the tap 27, a drilled block 44 is secured to the supporting rod as by welding or other suitable means. Block 44 supports an arm 45 which is adjustable toward or away from the tap 27 in the block and may be secured in the desired position by a setscrew 46 threaded in the block for engagement with the arm 45. At the end of arm 45 which is in closest proximity to the tap 27, a flat spring-positioning member such as finger 47 is fastened to the arm by an adjusting screw 48 for swinging movement of the finger into or out of engagement with the tap 27. Preferably the finger 47 is of a resilient material such as spring steel so that the finger may be pressed into engagement with the tap 27 to hold the tap from turning after it is set in the desired position. Tap 27 has flutes 49 extending between lands 51 which carry cutting threads 52 on the outer periphery of the tap. At the distal end of the tap 27, the lands 51 have chamfers 53.

As shown in FIGS. 4 and 5, a dressing tool 54 may be mounted in a supporting bearing member 55 which has a dovetail slot 56 carried by a dovetail track 57 mounted on top face 58 of the tool holding body 11. The track 57 extends in a direction toward the grinding wheel 16 and in the same direction as the tap 27. A locking screw 59 with a turning lever 61 is threaded in the side of the bearing member 55 for locking engagement with the dovetail track 57. The bearing member 55 has a cylindrical hole 62 extending through the member in the same direction as the dovetail slot 56 for receiving a shaft 63 of the dressing tool 54. A dressing pin 65 extends through a hole in one end of the shaft 63 and is secured therein for adjustment by a screw 66. A cutting element such as a diamond 67 is carried by one end of the dressing pin for engagement with the grinding wheel 16. The shaft 63 has a shoulder 68 for engagement with the edge of the bearing member 55. At the other end of the shaft 63 a handle 69 may be connected by a pin and slot arrangement 71 for turning the shaft to shape the grinding wheel in one position and for removal of the shaft from the cylindrical hole 62 in another position.

Referring to FIG. 6, a modification is shown in which a tap length adjusting means is provided for taps having shanks longer than the tool holding body 11. In this modification, the back plate member 29 has been removed and the tap bushing 21' carrying the tap 27' extends through the hole holding body 11. The shank 26' of the tap 27' extends out of the tap bushing 21' and is engaged by an arm 71 carried by an adjusting rod 72 which extends through the cylindrical hole 62 in bearing member 55. A thumbscrew 73 is threaded in the bearing member 55 for engagement with the adjusting rod 72 to hold it in position and thereby support tap 27' in a position where the desired length of the tap extends out of the tool holding body 11.

To sharpen a tap 27 in accordance with the process of the invention and with the tap grinding fixture 10, the swivel base 12 is mounted on the grinder bed 13 so that the tap will lie in substantially the same plane, that is the centerline of the tap 27 will lie in substantially the same plane X—X, shown in FIG. 4, as the plane of rotation of the grinding wheel 16. The tool holding body 11 is turned to the horizontal position and the bearing member 55 carrying dressing tool 54 is mounted on the top face of the tool holding body. The dressing pin 65 is adjusted by means of screw 66 so that the distance between the diamond 67 and the axis of rotation of the shaft 63 in the bearing member 55 is equal to one-half the diameter of the tap 27. The movable bed 13 of the grinder is then moved toward the grinding wheel 16 so that the diamond 67 comes into engagement with the grinding wheel 16 whereupon turning of the dressing tool 54 about the axis of shaft 63 with handle 69 shapes the periphery of the rotating grinding wheel 16 to a concave contour cross section suitable for sharpening the chamfer 53 of the tap 27.

After the wheel 16 is dressed, the tap grinding fixture 10 is moved away from the grinding wheel and the dressing tool 54 may be removed from the supporting bearing member 55. The tap 27 may then be mounted in the tool holding body 11 in a tap bushing 21 which is held in position by the spring-loaded pin 24. The longitudinal or lengthwise position of the tap is then adjusted by turning the thumbscrew 32 as shown in FIG. 3 or if the tap 27' has a long shank, by the adjusting rod 72 as shown in FIG. 6. The position of the land 51 is set by engagement of the end of the finger 47 with the edge of the cutting surface of the land to be ground. The tool holding body 11 is then turned about the axis of screw 30 as shown in FIG. 1 on the swivel base 12 so that the chamfer 53 will be in tangential engagement with the periphery of the grinding wheel 16. The tap grinding fixture 10 is moved with the axis of the tap substantially in the plane of rotation of the grinding wheel X—X into engagement with the grinding wheel 16 for sharpening the land 49.

In order to sharpen the next land of the tap 27, it is only necessary to turn the tap in a clockwise direction as seen in FIG. 4, so that the finger is sprung radially outward by the next adjacent land and then springs radially inward against the edge of the land after which the next land of the tool is positioned for grinding by the grinding wheel 16. It is also possible to obtain a desired cutting clearance at the chamfer by grinding the land with the axis of the tap parallel to, but spaced from the plane of rotation X—X of the grinding wheel.

The tap 27 shown and described is ground with the tool holding body 11 tilted in the position shown to provide the desired chamfer. For a tap of the opposite hand it will be understood that the tool holding body 11 may be turned over about the axis of screw 30 to tilt the tap in the opposite direction and the grinding operation performed in a similar manner to that described for the tap 27 to provide the desired chamfer.

I claim:

1. Apparatus for grinding thread cutting tools by relative tangential engagement of the tool with a grinding wheel through movement of the tool with its axis substantially in the plane of rotation of the grinding wheel which comprises a tool holding body, an opening in one end of said body for receiving the shank of the tool, positioning means mounted on one side of said body and projecting from that side towards the tool for engagement with the tool to index the tool against rotation during the grinding operation, adjusting means at the other end of said body for engagement with the shank of the tool to adjust the length of the tool projecting from said body and said adjusting means further comprising a screw member threaded in an end plate fastened to said body.

2. Apparatus for grinding thread cutting tools by relative tangential engagement of the tool with a grinding wheel through movement of the tool with its axis substantially in the plane of rotation of the grinding wheel which comprises a tool holding body, an opening in said body for receiving the shank of the tool, positioning means mounted on said body for engagement with the tool to index the tool against rotation during the grinding operation, a wheel dressing tool including a bearing member slidably mounted on a track on top of said body for adjustment thereon, a rod rotatably mounted in said bearing member for swinging movement therein and a wheel dressing pin adjustably secured to said rod for swinging movement into engagement with the outer periphery of a grinding wheel to shape the grinding wheel.

3. Apparatus for grinding thread cutting tools by relative tangential engagement of the tool with a grinding wheel through movement of the tool with its axis substantially in the plane of rotation of the grinding wheel which comprises a tool holding body, an opening in said body for receiving the shank of the tool, a wheel dressing tool including a bearing member slidably mounted on a track on said body for adjustment thereon, a support rotatably mounted in said bearing member for swinging movement therein and a wheel dressing pin adjustably secured to said support for swinging movement into engagement with the outer periphery of a grinding wheel to shape the grinding wheel.

4. Apparatus for grinding thread cutting tools according to claim 3 wherein positioning means are mounted on said body for engagement with the tool to index the tool against rotation during the grinding operation.

5. Apparatus for grinding thread cutting tools according to claim 3 wherein said wheel dressing pin is secured to said support for swinging movement about an axis located in the plane of rotation of said grinding wheel.

6. Apparatus for grinding thread cutting tools according to claim 5 wherein said wheel dressing pin has a radius of rotation equal to one-half the diameter of the thread cutting tool for obtaining the desired chamfer.

7. Apparatus for grinding thread cutting tools according to claim 2 wherein said bearing member supports an adjusting rod when said wheel dressing tool is removed, said adjusting rod having an arm extending over said opening at the opposite end of said body for engagement with the shank of a tool to adjust the longitudinal position of the tool and locking means to hold said adjusting rod in position in said bearing member.

References Cited

UNITED STATES PATENTS

| | | | |
|---|---|---|---|
| 1,363,194 | 12/1920 | Koning | 51—225 |
| 1,675,858 | 7/1928 | Litter | 51—225 |
| 2,035,163 | 3/1936 | Holmberg | 51—225 |
| 2,040,709 | 5/1936 | Pruitt | 51—225 |
| 2,484,590 | 10/1949 | Rocheleau | 51—225 |
| 2,690,037 | 9/1954 | Meyer | 51—221 |
| 2,700,854 | 2/1955 | Detrow | 51—225 |
| 2,720,731 | 10/1955 | Staat | 51—225 |
| 2,785,510 | 3/1957 | Garrison | 51—5 |
| 3,117,399 | 1/1964 | Schoeppell | 51—225 |
| 3,299,577 | 1/1967 | Pernack et al. | 51—5 |
| 3,406,486 | 10/1968 | Bettcher | 51—5 |

WILLIAM R. ARMSTRONG, Primary Examiner

U.S. Cl. X.R.

51—5, 98; 125—11